R. H. HEMPHILL.
TRANSMISSION GEARING.
APPLICATION FILED MAR. 6, 1913.
1,134,385.
Patented Apr. 6, 1915.
3 SHEETS—SHEET 3.
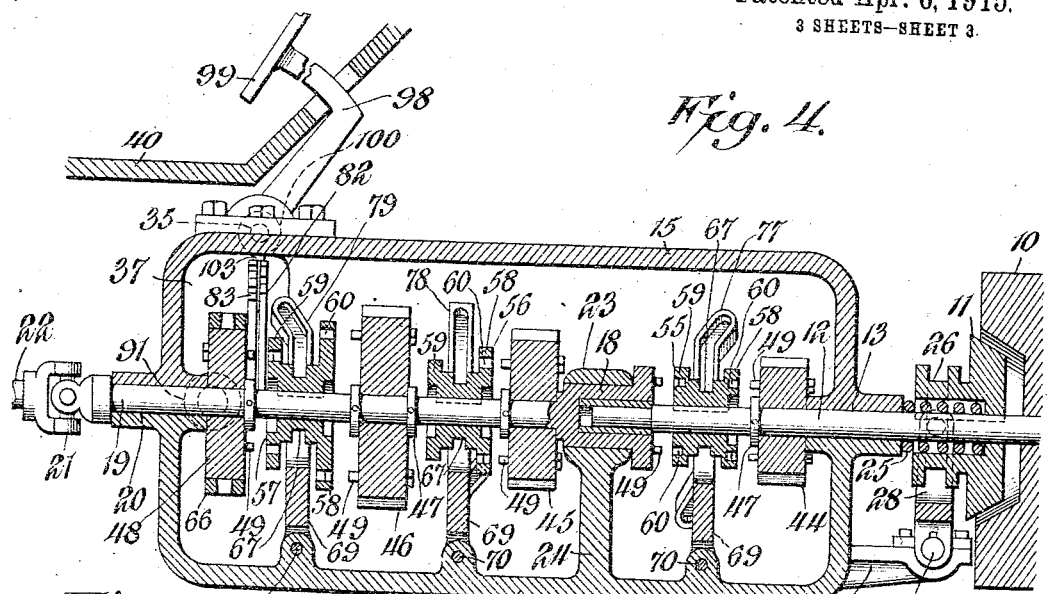
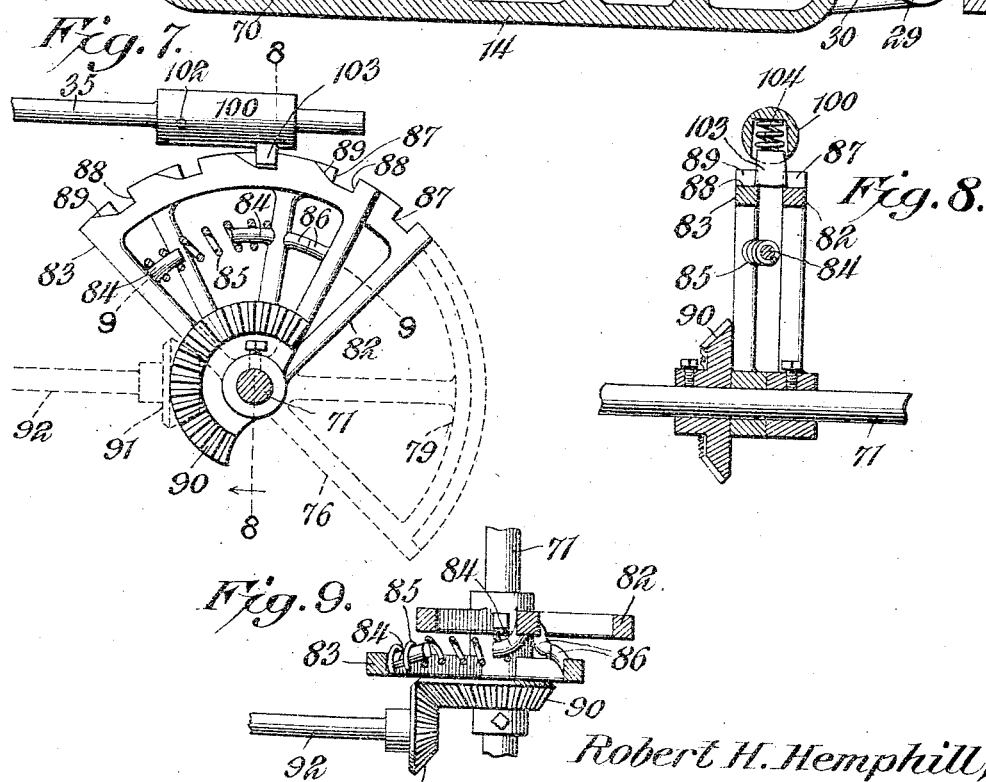
WITNESSES
Howard Orr.
F. T. Chapman
Robert H. Hemphill,
INVENTOR,
BY
ATTORNEY

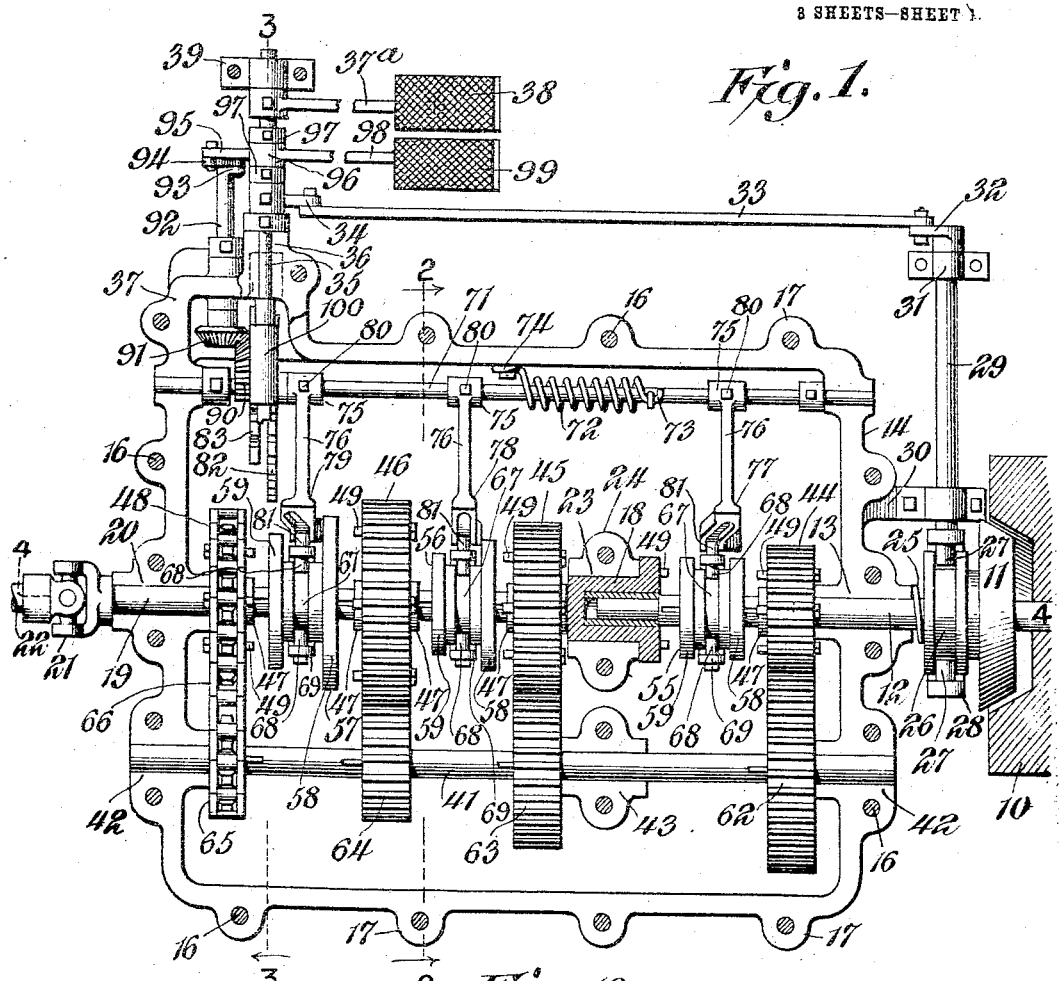

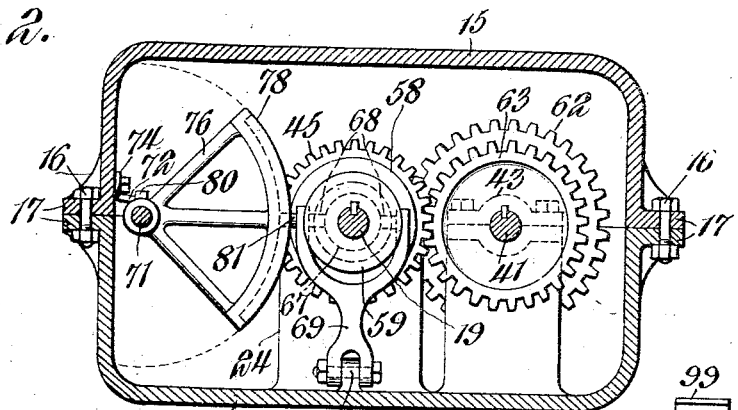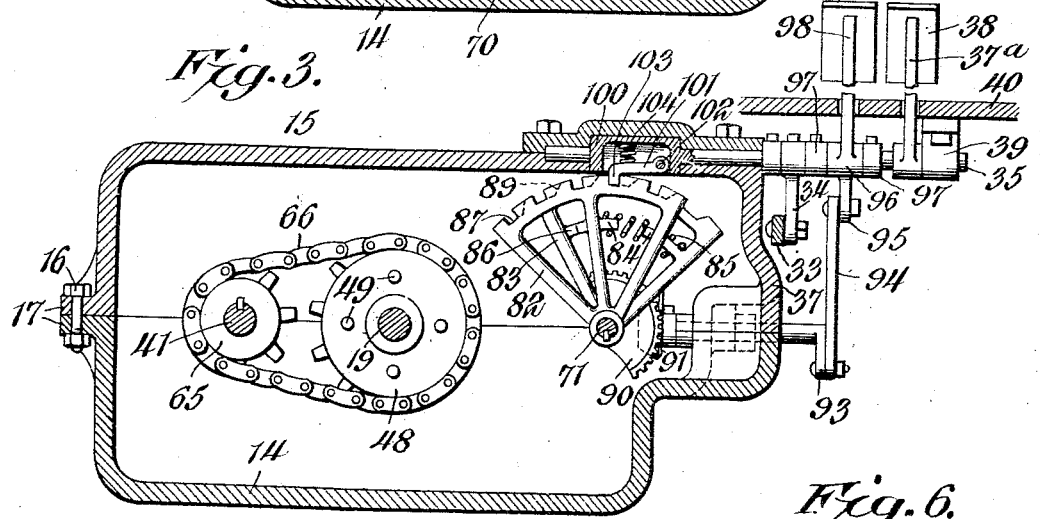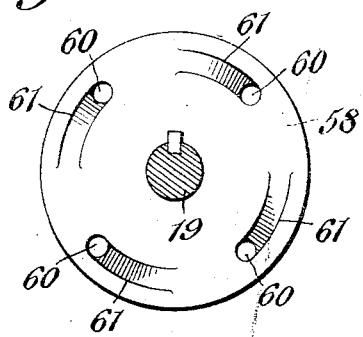

UNITED STATES PATENT OFFICE.

ROBERT H. HEMPHILL, OF PORT ST. JOE, FLORIDA.

TRANSMISSION-GEARING.

1,134,385.  Specification of Letters Patent.  Patented Apr. 6, 1915.

Application filed March 6, 1913. Serial No. 752,507.

*To all whom it may concern:*

Be it known that I, ROBERT H. HEMPHILL, a citizen of the United States, residing at Port St. Joe, in the county of Calhoun and State of Florida, have invented a new and useful Transmission-Gearing, of which the following is a specification.

This invention has reference to improvements in transmission gearing controlling means for automobiles, and its object is to provide means whereby the shifting levers usually employed are eliminated and all the shifting of the gears may be controlled by a foot pedal, and especially the clutch pedal, with the result that the shifting of the transmission gearing from one position to another may be accomplished without the necessity of the operator removing the hands from the steering wheel, and, also, making it impossible to perform the shifting operation while the clutch is in active or engaged position.

In accordance with the present invention the transmission gearing *per se* may be of any suitable type, but is preferably of a type where the gear wheels are always in mesh and are coupled up to the drive shaft by means of coupling or clutch members movable into and out of engaged position by impelling devices to be hereinafter described, which impelling devices are controlled by the clutch pedal through an escapement mechanism also to be hereinafter described, and constituting part of the present invention.

The structure of the present invention is such that by a chosen movement of the clutch pedal while the clutch is out of active engagement the transmission gearing may be moved step by step from one extreme position of engagement to the other, these steps including the reverse, neutral and first, second and third speeds, all in the order named, although, of course, an arrangement may be readily provided for a greater or less number of changes of speed if such be desirable since some makes of automobiles provide for two and some for four variations of forward speed.

It is an important feature of the present invention that when the clutch pedal or other clutch controlling means is operated in the usual or customary manner for the disengagement of the clutch, the transmission gearing is caused to automatically move to the positions and in the order named.

The invention will be best understood from a consideration of the following detailed description, taken in connection with the accompanying drawings forming a part of this specification, with the further understanding that while the drawings show a practical embodiment of the invention the latter is not confined to any strict conformity with the showing of the drawings but may be changed and modified so long as such changes and modifications mark no material departure from the salient features of the invention.

In the drawings:—Figure 1 is a plan view of the improved transmission gearing controlling means with some parts in section and with the top portion of the casing of the transmission gearing omitted. Fig. 2 is a section on the line 2—2 of Fig. 1. Fig. 3 is a section on the line 3—3 of Fig. 1. Fig. 4 is a section on the line 4—4 of Fig. 1. Fig. 5 is a face view of one of the coupling members. Fig. 6 is a detail section, on a larger scale than the other views, of one of the elastically mounted coupling pins of the coupling members. Fig. 7 is a detail elevation on a larger scale than some of the other figures of the escapement mechanism employed in the transmission gearing controlling means. Fig. 8 is a section on the line 8—8 of Fig. 7. Fig. 9 is a section on the line 9—9 of Fig. 7. Fig. 10 is a more or less diagrammatic representation of the shifting cam segments for the coupling members.

Referring to the drawings, there is shown a clutch comprising two members 10 and 11, the member 10 being customarily directly connected to the prime mover or explosion engine and the member 11 keyed to a shaft 12 extending through a bearing 13 in a casing made up of two members 14, 15, secured together by bolts 16 extending through ears 17 on the exterior walls of the casing in matching relation, the casing 14, 15 inclosing the transmission gearing to be described. The member 10 of the clutch may be taken as indicative of an explosion engine, the construction of which does not enter into the present invention, and hence such engine is neither shown nor described, but is simply typified by the member 10.

That end of the shaft 12 within the casing has a bearing in a socket member 18 on one end of another shaft 19 in alinement with the shaft 12, and having a bearing 20 in that end of the casing 14, 15 remote from the bearing 13, while exterior to the casing the shaft 19 is connected by a knuckle or universal joint 21 to another shaft 22 for transmitting power to the differential, which in turn transmits power to the driving wheels of the automobile as is the customary practice. The socket member 18 is mounted in a bearing 23 on one end of a post or support 24 rising from the casing member 14.

The clutch member 11 is slidably keyed to the shaft 12, being urged to the coupled position by a spring 25 as is customary, and, also, has a grooved hub 26 in which engages pins 27 on a yoke 28 carried by a rock shaft 29 having bearings in a bracket 30 which may project from the casing member 14, or be supported in any other suitable manner, and the shaft 29 is prolonged and provided with other bearings 31 and at the end remote from the yoke 26 carries a rock arm 32 connected by a link 33 with another rock arm 34 fast on a shaft 35 extended through bearings 36 into an offset portion 37 of the casing members 14 and 15. In the arrangement shown the shaft 35 is parallel with the shaft 29 and fast to this shaft 35 is a pedal arm 37a terminating in a pedal 38. The shaft 35 at the end remote from that entering the casing is shown as provided with a bearing 39 which may be made fast to any appropriate part of the machine, as the flooring 40, for instance.

In the construction shown the clutch members 10 and 11 are normally in engagement because of the normal action of the spring 25, and when it is desired to move the clutch out of engagement pressure is exerted upon the pedal 38, as is customary. The clutch and its operating mechanism so far as any special construction thereof is concerned, do not enter into the present invention, and hence the showing of the drawings with respect to the clutch and the operating mechanism therefor may be considered as typical of any suitable devices for the purpose.

Mounted within the casing 14, 15 to one side of and parallel with the shafts 12 and 19 is a countershaft 41, which in addition to end bearings 42 in the walls of the casing members 14 and 15 may have an intermediate bearing 43 adjacent the bearing 23 of the shaft 19.

Mounted to turn loosely on the shaft 12 is a gear wheel 44 and mounted to turn loosely on the shaft 19 are gear wheels 45, 46, respectively, all these gear wheels being held against longitudinal movement on the respective shafts by set collars 47 or any other suitable means. The shaft 19 also carries a sprocket wheel 48 mounted to turn loosely on the shaft and held against longitudinal movement by a set collar 47. The gear wheels 44, 45 and 46, the sprocket wheel 48 and the socket member 18 of the shaft 19 are each provided with pins 49 shown on a larger scale in Fig. 6, say, in connection with the gear wheel 44. Each member carrying a pin 49 is provided with a socket or recess 50 of a diameter to accommodate the pin and a radial flange or collar 51 thereon, and at the end of the recess traversed by the projecting part of the pin 49 the recess is reduced in diameter to permit the passage of the pin without material side play. That end of the recess 50 remote from the reduced end is normally closed by a screw bushing 52 provided with an axial passage 53 of a size to receive the corresponding end of the pin 49 and the passage 53 opens to the atmosphere, so that the pin may move lengthwise of the passage without interference from air compression. Surrounding the pin 49 between the collar 51 and the inner end of the bushing 52 is a spring 54 tending to maintain the pin projected, but yieldable to a superior force.

On the shaft 12 between the gear wheel 44 and the socket end 18 of the shaft 19 there is mounted a coupling member 55, and like coupling members 56, 57, are mounted between the gear wheels 45 and 46, and the gear wheel 46 and sprocket 48, respectively. Each coupling member 55, 56 and 57 consists of two disk-like heads 58, 59, except that the head 59 of the coupling member 56 is an inactive member. These heads are at opposite ends of the respective coupling members and one of these heads, say the head 58, is separately shown in face view in Fig. 5, and is shown in section in Fig. 6 in connection with the gear wheel 44. Each head 58 and 59 with the exception of the head 59 of the coupling member 56, is provided with a circular series of equally spaced perforations 60 having leading in grooves 61 each gradually deepening toward the respective perforation 60 and curved on an axis coincident with the axis of rotation of the respective coupling member. These perforations 60 are so related to the pins 49 that when a coupling member is moved toward a pinion or other part to be coupled should it transpire that the perforations 60 and the pins 49 do not at the time match, the pins will yield because of the presence of the springs 54 and as the corresponding coupling member rotates, or the corresponding gear wheel or other part to be connected rotates, the pin will be carried into the corresponding groove 61 and be projected by the spring 54 as the groove deepens, until the end of the groove which is coincident with the corresponding perforation 60 is reached, whereupon the two parts are coupled together. This gives a certainty of engagement over a material portion of the length of a pin 49 without liability of the pin missing the perforation 60 or making engagement with the head containing the perforation, so imperfectly as to endanger the parts or to produce a liability of breakage of the parts under the load because of too slight an engagement.

Mounted on the shaft 41 are gear wheels 62, 63, and 64, respectively, and a sprocket wheel or pinion 65, all these parts being keyed to the shaft 41. The gear wheel 62 is in the showing of the drawings relatively large and is in constant mesh with the gear wheel 44, which is of relatively small diameter. The gear wheels 45 and 63 are in constant mesh and may be of substantially the same diameter. The gear wheels 46 and 64 are in constant mesh and the gear wheel 46 may be of relatively large diameter, while the gear wheel 64 is of relatively small diameter. The sprocket wheel or pinion 65 is constantly connected to the sprocket wheel 48 by a sprocket chain 66.

Each coupling member 55, 56 and 57 has an intermediate peripheral groove 67 in which engages rollers 68 on the ends of the legs of a yoke 69 pivotally supported as shown at 70 at the bottom of the casing member 14, so that the yoke may rock about its pivot on an axis at right angles to the axis of the shafts 12 and 19.

Before giving a description of the manner of operating the coupling members 55, 56 and 57, the action of these coupling members when properly actuated may be first considered. If it be assumed that the engine is running and the clutch member 11 is out of engagement with the engine 10, then the transmission mechanism is quiescent. Suppose, however, that the clutch member 11 is released to the action of the spring 25, then motion from the engine is imparted to the shaft 12 and the shaft 12 is driven at the same speed of rotation as the engine. The result of this is that the shaft 12 and the coupling member 55 are rotating at engine speed, but all the rest of the transmission gearing is standing still, for the reason that the coupling member 55 is intermediate of the gear wheel 44 and the shaft head 18 in the position shown in Figs. 1 and 4 and out of engagement with either of them. Suppose, now, that the coupling member 55 is moved toward the socket member 18, the pins 49 on the socket member 18, which pins may be of any suitable number, say, four or more, are engaged by the head 59 of the coupling member 55, and if these pins are not in line with the perforations 60 they will travel along the grooves 61 until the perforations 60 are reached, whereupon the shaft 12 becomes coupled to the socket member 18 and as the latter is fast to the shaft 19 the said shaft has a rotation at engine speed imparted to it, and this speed of rotation is finally transmitted to the drive wheels. This marks the highest speed provided in the particular arrangement shown. Suppose, however, that the coupling member 55 be moved into engagement with the gear wheel 44, then engine speed is imparted to the gear wheel 44 and as the latter is in constant mesh with the gear wheel 62 a speed is transmitted to the countershaft 41 proportionate to the relative diameters of the gear wheels 44 and 62. It may be assumed for purposes of illustration that the gear wheel 62 has twice the diameter of the gear wheel 34, whereupon the shaft 41 will rotate at one-half engine speed. Assuming that the gear wheels 45 and 63 are of the same diameter, the gear wheel 45 will rotate at one-half engine speed. If it be further assumed that the gear wheel 64 is one-half the diameter of the gear wheel 46, then the latter will rotate at one-quarter engine speed.

The coupling member 56 is arranged to connect with the gear wheel 45 only, so that under such circumstances with the gear wheel 44 coupled to the shaft 12 and the gear wheel 45 coupled to the shaft 19, the latter will rotate at one-half engine speed. Suppose, however, that the coupling member 56 is inactive and the coupling member 57 is moved into engagement with the gear wheel 46, while the gear wheel 44 remains coupled to the shaft 12, thus the shaft 19 will rotate at one-quarter engine speed. In each of the conditions already assumed the direction of rotation of the shaft 19 is the same as that of the engine shaft, and this may be considered as the proper direction to cause a forward movement of the vehicle.

Suppose that the coupling member 57 be moved away from the gear wheel 46 until it is in engagement with the sprocket wheel 48, thus coupling the latter to the shaft 19. If, now, the gear wheel 44 be coupled to the shaft 12 and the sprocket wheel 48 be coupled to the shaft 19 with the other two gear wheels 45 and 46 uncoupled from or loose on the shaft 19, then motion is transmitted from the shaft 12 by way of the gear wheels 44 and 62 to the shaft 41, turning the latter in the reverse direction to the direction of rotation of the shaft 12. Now as the sprocket wheels 48 and 65 are connected by the chain 66 for rotation in the same direction, then the motion of the shaft 12 is transmitted to the shaft 19 in a manner to cause the latter to rotate in a direction opposite to the direction of rotation of the shaft 12. Assuming as before that the shaft 41 is rotating at half the speed of the shaft 12 and that the sprocket wheel 65 is one-half the diameter of the sprocket wheel 48, then motion of the shaft 19 is one-quarter that of the engine shaft and in the reverse direction. By this means the automobile may be backed or reversed as to direction of travel. By this means, so far as the gears and the sprocket chain arrangement is concerned, provision is made for three different speeds forward and slow speed backward, and the gearing and sprocket chain connections may be similar to those commonly employed in automobiles. The particular arrangement of the gears and sprocket wheels and chain does not in itself form part of the present invention, but has been described somewhat in detail in order to more clearly explain the action of the other parts of the structure entering into the invention.

Journaled at the ends in the casing members 14 and 15 at the side thereof remote from the shaft 41 is another shaft 71 which because of its action may be termed a rock shaft. This shaft is urged in one direction by a spring 72 wound around it and connected at one end 73 to the shaft and at the other end 74 to the casing. Mounted on the rock shaft 71 by means of respective hubs 75 and arms 76 are cam segments 77, 78 and 79, respectively, each hub 75 being secured to the shaft 71 by a set screw 80 or in any other appropriate manner. On each yoke 69 there is a roller 81 which may be in line with one of the rollers 68, and each pin 81 enters a cam groove in the respective cam segment 77, 78 or 79. Each cam segment is formed with a groove designed to receive the respective pin 81 and each groove is appropriately shaped to cause a certain movement of the respective yoke 69.

By reference to Fig. 10 it will be seen that each cam segment 77, 78 and 79 has a groove extending throughout its length on what may be termed the convex face of the head of the cam and the center line of the head of the cam may be considered as the line $a$—$b$ of the several cams shown in Fig. 10. Furthermore, these cams are movable simultaneously by steps to several different positions indicated by the dotted lines R—R, N—N, and 1—1, 2—2, and 3—3, respectively. In Fig. 10 the pins 81 are shown in simple outline as occupying the position defined by the dotted line N—N. The groove of the cam 77 extends at an angle to the right of the line $a$—$b$ as viewed in Fig. 10 to the line R—R. The same groove extends at an angle to the right until it reaches the position 1—1 and then continues in a line parallel with the center line $a$—$b$ until it reaches the line 2—2, and then at an angle toward the left until it reaches the line 3—3 at a point as far to the left of the line $a$—$b$ as it was to the right of said line in the position 2—2.

If the cam segment 77 be assumed to be in position where the pin 81 is at the extreme upper end thereof as viewed in Fig. 10, such position of the pin being shown in dotted lines, then as the cam 77 moves upwardly the pin 81 is moved toward the left until it reaches the line $a$—$b$ and then the movement of the cam continuing, the pin 81 is forced to the right until in the same relation to the line $a$—$b$ as in its first considered position, and this position is maintained during the extent of travel from the line 1—1 to the line 2—2. Then the travel of the cam continuing the pin 81 is caused to move laterally until it reaches the corresponding end of the cam groove represented by the line 3—3, having in the meantime crossed the position of the line $a$—$b$ and moved to a corresponding distance to the left of this line. These several positions of the pin 81 with the exception of that on the line N—N are represented by dotted lines, and, moreover, they define the movements of the coupling member 55 which participates in the movement of the pin 81 belonging to it. When the pin is in the position R with relation to the cam member 77 the coupling member 55 has its head 58 in engagement with the gear wheel 44. When the pin 81 is in the position N the coupling member 55 is intermediate of the gear 44 and the socket member 18. When the pin 81 is in the positions 1 and 2 the coupling member 55 is connected to the gear wheel 44 and when the pin 81 is in the position 3 then the head 59 of the coupling member 55 has been moved into coupling engagement with the boss 18.

The segment 78 has its cam groove all in the center line $a$—$b$ except an offset between the lines 1 and 3, this offset being toward the right as viewed in Fig. 10, so that in the position 2 the coupling is moved to the right sufficiently to cause the coupling member 56 to be connected to the gear wheel 45, but in all other positions of the cam head 78 the coupling member 56 is inactive.

The coupling member 79 has the positions N, 2 and 3 all in the line $a$—$b$, while the position R is to the left of this line, and the position 1 is to the right of such line.

With the cam head 79 the coupling member 57 is in engagement with the sprocket wheel 48 when the pin 81 is in the position R, and this coupling member 57 is in engagement with the gear wheel 46 when the pin 81 is in the position 1, but in the positions N, 2 and 3 the coupling member 57 is out of engagement with either the gear 46 or the sprocket wheel 48.

Since the heads 77, 78 and 79 are all fast to the rock shaft 71 they move simultaneously. When they are all in a position which will cause the pins 81 to be at the end designated by the line R—R, then the coupling member 55 connects the gear wheel 44 to the shaft 12, and the coupling member 57 connects the sprocket wheel 48 to the shaft 19, while the coupling member 56 is inactive. This position of the parts with the clutch 10, 11 in engagement will cause the backing or reverse movement of the automobile, wherefore the position R—R is the "reverse" position of the transmission mechanism. In the position N—N where the pins 81 are all in the line $a$—$b$ all the coupling members are in the inactive or neutral position, wherefore the line N—N indicates the "neutral" position. When the pins 81 are in the position 1—1 with reference to the cam grooves, then the gear wheel 44 is coupled to the shaft 12 and the gear wheel 46 is coupled to the shaft 19, thus setting the transmission for forward speed No. 1. When the pins 81 of the cams are in the position indicated by the line 2—2 then the gear wheel 44 is connected to the shaft 12 and the gear wheel 45 to the shaft 19, thus causing the shaft 19 to move with speed No. 2. When the pins 81 are in the position indicated by the line 3 with reference to the cam heads, then none of the gear wheels is connected to the shaft 12, but the coupling member 55 is moved into engagement with the socket member 18 of the shaft 19, so that the engine shaft and the shaft 19 are caused to rotate at the same speed, this representing the highest or third speed of transmission with the arrangement shown in the drawings.

The tendency of the spring 72 is to rock the shaft 71 to move the cam heads, until the pins 81 are all in the position 3—3, this representing the highest speed position of transmission which the parts would assume automatically if not prevented.

To control the setting of the transmission mechanism to the different positions described, the shaft 71 near one end carries an escapement segment 82 keyed or otherwise fastened thereto and adjacent the segment 82, but spaced therefrom and loose upon the shaft 71 is another escapement segment 83. The two segments 82 and 83 have opposed studs 84 carrying between them a spring 85 tending to move the segments in opposite directions and both segments have also stop lugs 86 so related as to permit but a limited movement of the two segments in opposite directions under the action of the spring 85. The segment 82 has a series of notches 87 formed in its periphery, the spacing of the notches being proportional to the distance between the several step positions of the cam heads 77, 78 and 79. The segment 83 has a like series of similarly spaced notches 88, but while the notches 87 have abrupt shoulders at both ends, the notches 88 have each an abrupt shoulder at one end and an inclined shoulder 89 at the other.

Fixed to the shaft 71 is a gear segment 90 which since the shaft 71 at no time makes a full revolution need not be a complete gear. Meshing with the gear 90 which is in the particular instance shown a bevel gear, is a bevel pinion 91 on one end of a rock shaft 92 journaled in the extension 37 of the casing and extending to the exterior thereof where it is formed with a lock arm 93 connected by a link 94 to an arm 95 projecting from a hub 96 mounted loosely on the shaft 35 as between set collars 97, and extending from the hub 96 on the side remote from the arm 95 is a pedal arm 98 terminating in a pedal 99.

That end of the shaft 35 within the casing is provided with an enlarged portion 100 which may be an integral part of the shaft or be attached thereto in any manner, and this enlarged portion is open at one side to constitute a pocket or receptacle for a dog 101 pivoted at one end within the receptacle, as indicated at 102, and at the other end formed into a nose 103 at an angle to the length of the dog. This dog is constantly urged to a position of projection so far as its nose end is concerned with relation to the receptacle carrying it by a spring 104 within the receptacle. The nose 103 is so related to the notches 87 and 88 as to be capable of engaging therein and the width of the nose is sufficient to bridge the space between the peripheral portions of the segments 82 and 83 where the notches 87 and 88 are formed, but the width of the nose is only sufficient to make good engagement with the corresponding shoulders of both notches 87 and 88 which may be in matching relation without requiring an extended movement of the dog to escape engagement with either. The shaft 35 under the control of the pedal 38 is in reality a rock shaft, and the nose 103 of the dog 101 participates in such rocking movement.

The extent of rocking movement of the pedal shaft 35 is so limited that at all times one or the other of the segments 82 or 83 is under the control of the nose 103 of the dog 101. The tendency of the spring 72 is to turn the shaft 71 in a direction to raise the cam heads 77, 78 and 79, this direction being toward the left or counterclockwise as the segments 82 and 83 are viewed in Fig. 7.

Let it be assumed that the nose 103 is moved from the position shown in Fig. 8, where both segments are locked by the nose, so that this nose leaves the notch 87 and enters more deeply into the notch 88. Now, the spring 72 having a constant tendency to rotate the shaft 71 in a counterclockwise direction as viewed in Fig. 7 immediately carries the segment 82 to the left or counterclockwise, while the segment 83 is held from movement by the nose 103 lodged in a notch 88 thereof. The rotative movement of the shaft 71 carrying the segment 82 with it continues until the stop lugs 84 contact, the spring 85 being thereby compressed. The rotative motion of the shaft 71 under the action of the spring 72 is arrested by the engagement of the stops 84 because the segment 83 is then locked by the nose 103. Now let it be assumed that the clutch pedal is so operated as to rock the shaft 35 in a direction to carry the nose 103 out of the particular notch 88 in which it is assumed to be lodged, and into the notch 87 of the segment 82 then in its path. Now the segment 83, which is loose upon the shaft 71 while the segment 82 is keyed or otherwise fastened thereto, is rocked counterclockwise as viewed in Fig. 7 by the expansion of the spring 85, and this movement continues until the lugs 86 engage, at which point a notch 88 of the segment 83 coincides with the notch 87 of the segment 82 at that time entered by the nose 103. If, now, the shaft 35 be again rocked to bring the nose 103 into the corresponding notch 88, the shaft 71 is again released to a limited movement under the action of the spring 72. Thus, by alternately pressing and releasing the pedal 38 the cam shaft 35 is rocked in opposite directions and the segments 82 and 83 are alternately released to permit a step by step movement of the shaft 71, so that the segments 82 and 83 act as an escapement in conjunction with the dog 101. The movement of the shaft 71 in the active direction is wholly due to the spring 72 and when it is desirable to return the shaft to its first position the pedal 99, which may be termed the shifting pedal, is moved by the foot of the operator to turn the shaft 92 which through the bevel gears 91 and 90 rotates or rocks the shaft 71 in a direction to put the spring 72 under tension and at the same time move the cam heads 77, 78 and 79 toward the position where the pins 81 are in the line R, that is, in the position of reverse. Of course, if it is not desired to move the parts to such position the movement of the pedal 99 is made less extensive. This reverse movement is made possible by moving the clutch pedal 38 until the dog 101 has its nose 103 in the notches 88 and then a movement of the segment 83 toward the right or clockwise will cause the inclined shoulders 89 of the notches 88 to push the dog out of the way against the action of the spring 104, the two segments moving simultaneously because of the engagement of the stops 86.

The active movement of the clutch pedal for clutching the engine to the driving shaft 12 is so proportioned that the shifting of the transmission gearing is accomplished while the clutch is open and by no possibility can the shifting be performed, while the clutch is in the engaged position, for then the nose 103 of the dog 101 is in some one of the notches 87 and the cam heads 77, 78 and 79 are positively locked in whatever position they may then be.

The operator may be guided in the actuation of the pedals by suitable indexes, but soon becomes sufficiently skilled to perform the operations necessary without observance of the indexes.

If the automobile is standing still, and for any reason it is desirable to back the machine, the operator presses the clutch pedal to the position releasing the shaft 71 to the pedal 99 and the latter is moved to the full extent, this resulting in the automatic setting of the transmission mechanism for reverse, and then by releasing the clutch pedal the clutch is moved into engagement and the vehicle is backed. Suppose, however, that it is simply desired to leave the vehicle with the transmission mechanism in the neutral position ready for either starting or backing, then the clutch pedal is actuated if the transmission mechanism is in reverse until the neutral position is reached, when a release of the clutch pedal will carry the nose 103 into engagement with the suitable notch of the segment 82, thus locking the transmission mechanism in the neutral position. When it is desired to start the machine forward, which, of course, should be done on the low gear or first position, it is then only necessary to rock the clutch pedal by one impulse, whereupon the transmission mechanism is set for the low gear, and by a proper operation of the clutch pedal the engine is connected up to the drive wheels and the machine starts on low speed. If it be desired to increase the speed the clutch is released and by a simple movement of the clutch pedal the gear is shifted to the intermediate position, whereupon the engine may be again clutched to the drive wheels through the transmission mechanism set at intermediate speed without possibility of change of rate of transmission while the clutch is in engagement. If the highest speed is desired, a still further operation of the clutch pedal will unclutch the engine and throw the gearing entirely out of action and then couple the two direct shafts together and finally clutch the engine thereto for the direct connection of the engine to the drive wheels for driving them at engine speed.

A feature of the present invention is that the transmission gearing moves automatically to the different operative positions, such movement being controllable at the will of the operator and the movement being progressive. The retrogressive or return movement of the transmission gearing is not automatic in the particular arrangement shown in the drawings, and while such return movement might be made automatic, it is not at all necessary that it should be. However, the arrangement is such that whenever there is a shift in the transmission gearing the clutch whereby the prime mover or power is coupled up to the transmission gearing, is in the unclutched or inactive position, so that the transmission gearing cannot be changed from one speed or position to another, while the power is coupled thereto.

What is claimed is:—

1. The combination with a clutch for connecting a prime mover to and disconnecting it from the work, of a pedal for operating the clutch, transmission gearing between the prime mover and the work, means for actuating and having a normal tendency to actuate the transmission gearing to different operative positions, and means actuated solely by the pedal for controlling the first-named means.

2. The combination with a clutch for connecting a prime mover to and disconnecting it from the work, of a pedal for operating the clutch, a transmission gearing between the prime mover and the work, means other than the pedal for actuating the transmission gearing progressively to different predetermined operative positions, and means actuated solely by the pedal for controlling the first-named means.

3. The combination with a clutch for connecting a prime mover to and disconnecting it from the work, of a pedal for operating the clutch, transmission gearing between the prime mover and the work, means for actuating and having a normal tendency to actuate the transmission gearing to different operative positions, and means actuated solely by the pedal for controlling the first-named means and timed to release the first-named means while the clutch is in the inactive position.

4. In combination, a clutch for coupling a prime mover to the work, a pedal for operating the clutch transmission gearing interposed between the prime mover and the work, means controlled solely by the clutch pedal for actuating the transmission gearing into and out of operative positions and timed in action to cause such movements while the clutch is in the inoperative position, the mechanism controlled by the clutch pedal when the clutch is inoperative being constructed to respond to reciprocatory movements of the pedal to actuate the transmission gearing in progressive order to the different operative positions.

5. In combination, a clutch for coupling a prime mover to and uncoupling it from the work, a reciprocatory pedal for actuating the clutch, transmission gearing between the prime mover and the work, means for causing the actuation of the transmission gearing to different operative positions in predetermined order, and means responsive to oscillatory movements of the clutch pedal while the clutch is in the inactive position for controlling the actuation of the transmission gearing to the different operative positions in the predetermined order.

6. In combination, a clutch for coupling a prime mover to and uncoupling it from the work, a clutch pedal for causing the operation of the clutch, transmission gearing between the prime mover and the work, automatic means for causing a progressive actuation of the transmission gearing into and out of active position, and means controlled by the clutch pedal for producing a step by step release of the automatic means.

7. In combination, a clutch for coupling a prime mover to and uncoupling it from the work, clutch controlling means, a transmission gearing between the prime mover and the work, automatic means having a normal tendency to actuate the transmission gearing to different operative positions in predetermined order, means controlled by the clutch controlling means for releasing the automatic means to operate in its normal manner, and means for restoring the automatic means to initial position.

8. In combination, a clutch for coupling a prime mover to the work, multi-speed transmission gearing between the prime mover and the work on the work side of the clutch, automatic means for coupling up elements of the transmission gearing in predetermined order, an escapement restraining means for said automatic means, and actuating means for the clutch and the escapement common to both and timed in action to cause the operation of the escapement when the clutch is in the inactive position.

9. In combination, a clutch for coupling a prime mover to and uncoupling it from the work, a multi-speed transmission gearing between the prime mover and the work on the work side of the clutch, automatic means movable progressively and constructed to operate the transmission gearing in predetermined order into and out of active positions, a step by step escapement for controlling the automatic means, means common to the clutch and the escapement mechanism and timed in operation to cause the release of the automatic means while the clutch is in the inactive position, and means for the restoration of the automatic means to initial position.

10. In combination, a clutch for coupling a prime mover to the work, and a transmission gearing on the work side of the clutch, automatic means for moving the transmission gearing elements into and out of active position and having a normal tendency to cause such movements in succession in predetermined order, an escapement mechanism normally restraining the automatic means and movable to cause the step by step release of said automatic means, a pedal connected both to the clutch and to the escapement mechanism for controlling them to cause the release of the escapement mechanism only when the clutch is in the inactive position, and a pedal and means controlled thereby for restoring the automatic means to initial position after operation.

11. The combination of a drive member, a driven member, devices for coupling the drive member to the driven member, automatic means having a constant tendency to actuate said devices, an escapement mechanism for a step by step release of the automatic means, and manually controllable means for the escapement mechanism.

12. The combination of a drive member, a driven member, devices for coupling the drive member to the driven member, automatic means having a constant tendency to actuate said devices, an escapement mechanism for a step by step release of the automatic means, and manually controllable means for the escapement mechanism, said automatic means being provided with manually controllable means for restoring it to initial position after release to its normal tendency.

13. The combination of a drive member, a driven member, and means for coupling up the drive and driven members in different relations of speed and direction of movements, said means including a rock shaft, a spring imparting thereto a normal tendency to move in one direction, an escapement member fast to the shaft, another escapement member loose on the shaft, said escapement members having stop means for limiting their relative movements, an escapement dog movable into engagement with either or both escapement members, and means for the manual actuation of the dog to release the rock shaft to its normal tendency through the escapement, at will.

14. The combination with transmission gearing, of actuating means therefor comprising a rock shaft, devices carried by the rock shaft in operative relation to the transmission gearing for coupling up said gearing in predetermined order, means for imparting to the rock shaft a normal tendency to move in one direction, an escapement member fast to the rock shaft, another escapement member mounted on the rock shaft in spaced relation to the first-named escapement member, said escapement members being provided with stop means for limiting their relative movements, an escapement dog of a width to bridge the distance between the escapement members and engage both simultaneously, and means for moving the dog into engagement with either or both escapement members.

15. The combination of a drive member, a driven member, means for imparting motion from the drive to the driven member at different rates of speed and in different directions, means for coupling up said first-named means in predetermined order and including a rock shaft with means tending constantly to impart rotative movement to said rock shaft in one direction, manually operable means for rotating the rock shaft in the other direction, an escapement member fast on the rock shaft, another escapement member loose on the rock shaft and located in spaced relation to the first-named escapement member, said escapement members having stop means for limiting their relative movements, an escapement dog rockable between the members and of a width to bridge the space between said members, and manually operable means for rocking the dog into engagement with either or both escapement members.

16. The combination of a drive member, a driven member, means for imparting motion from the drive member to the driven member at different rates of speed and in different directions, means for coupling up said first-named means in predetermined order and including a rock shaft, means constantly tending to impart rotative movement to the rock shaft in one direction, manually operable means for rotating the rock shaft in the other direction, an escapement member fast on the rock shaft, another escapement member loose on the rock shaft and located in spaced relation to the first-named member, said escapement members being provided with stop means for limiting their relative movements, an escapement dog rockable between the members and of a width to bridge the space between said members, and manually operable means for rocking the dog into engagement with either or both of said escapement members, a clutch for coupling the drive member to a prime mover, and connections between the clutch and the second-named manually operable means and timed with relation to the movement of the escapement dog to cause the release of the escapement only when the clutch is in the open position.

17. The combination of a suitable casing, a drive shaft and a driven shaft mounted in said casing, multi-speed transmission gears on the drive and driven shafts, coupling members mounted on the drive and driven shafts and movable to connect the gears to the respective shafts, actuating devices for the coupling members constructed to act thereon to couple the respective gears to the respective shafts in predetermined order, a rock shaft carrying the actuating devices, a spring connected to the rock shaft and tending constantly to move it in one direction, an escapement member fast on the rock shaft, another escapement member loose on the rock shaft, said escapement members being provided with stop means for limiting their relative movements, an escapement dog movable into engagement with either or both of said escapement members, a pedal connected to the dog for actuating the latter, another pedal connected to the rock shaft for moving the latter against the normal tendency of the spring, a clutch for coupling the drive shaft to a prime mover, and connections between the clutch and the first-named pedal, the active movement of the pedal being proportioned to cause the clutch to be moved to the unclutched position each time that the transmission gearing is moved to the inactive position.

18. The combination of shafts and gears thereon, slidable coupling members for connecting respective gears to respective shafts, an operating means for the coupling members including rockable cam devices having constant engagement with the coupling members, said cams being shaped and interrelated to move the coupling members in predetermined relation one to the other to cause a predetermined order of transmission of movement through the transmission gearing by the simultaneous progressive movement of the cams, automatic means for producing the active progressional movement of the cams, and manually operable means for controlling the automatic means, at will.

19. The combination with variable speed transmission gearing having shiftable members, of automatic means for causing the actuation of the shiftable members of the transmission gearing to produce different combinations of the transmission gears, and manually operable means for controlling the automatic means.

20. The combination with variable speed transmission gearing, of a clutch for connecting the transmission gearing to and disconnecting it from a prime mover, automatic means for changing the transmission gearing into different operative combinations, manually operable means for controlling the clutch, and means controlled by the clutch-controlling means for in turn controlling said automatic means.

21. In combination, a clutch for coupling a prime mover to and uncoupling it from the work, means for controlling the clutch to cause its movements to the coupling and uncoupling positions, variable speed transmission gearing between the clutch and the work and including shiftable members, automatic means for causing a progressive actuation of the shiftable parts of the transmission gearing, to produce different combinations of the transmission gears, and means controlled by the clutch controlling means for causing a step by step release of said automatic means.

22. A variable speed transmission gearing having shiftable parts and provided with automatic means for the actuation of the shiftable parts to produce correspondingly different combinations of the transmission gears, and means for the release of the automatic means in progressive step up order.

23. A variable speed transmission gearing having shiftable parts and provided with automatic means for setting the shiftable parts into position for reversal of the direction of drive and for low and higher speeds of drive, and means for controlling the setting of the transmission gearing in the different positions in the order named.

24. A variable speed transmission gearing having shiftable parts and provided with automatic means for setting the shiftable parts into position for reversal of the direction of drive and for low and higher speeds of drive, means for controlling the setting of the transmission gearing in the different positions in the order named, and means connected to the automatic means for setting the transmission gearing to any desired extent in the contrary order to that first-named.

25. The combination with a drive and a driven member, of means for connecting the drive member to and disconnecting it from the driven member, means for operating the first-named means, a variable speed transmission mechanism between the drive and driven parts, means other than the second-named means for actuating and having a normal tendency to actuate the transmission mechanism to different operative positions, and means controlled by the second-named means for in turn controlling the operation of the third-named means.

26. The combination with a drive and a driven member, of means for connecting the drive member to and disconnecting it from the driven member, means for operating the first-named means, a variable speed transmission mechanism between the drive and driven members, means other than the second-named means for actuating the transmission mechanism to different operative positions, and a release mechanism for the third-named means, the second-named means having connections with the release mechanism for controlling the operation thereof.

27. The combination with a drive and a driven member, of means for connecting the drive member to and disconnecting it from the driven member, means for operating the first-named means, a variable speed transmission mechanism between the drive and driven members, means other than the second-named means for actuating the transmission mechanism to different operative positions, and a release means for the third-named means connected to the second-named means for controlling the action of the third-named means, the second-named means having a range of movement sufficient for controlling the operation of the release means by movements less than the range of movement of the second-named means necessary to connect the drive member to and disconnect it from the driven member.

28. The combination with a drive and a driven member, of a clutch for connecting the drive member to and disconnecting it from the driven member, a pedal for operating the clutch mounted for oscillatory movements, transmission mechanism between the drive and driven members, means other than the pedal for actuating the transmission mechanism to different predetermined positions, and means controlled by the pedal for holding the first-named means inactive and for releasing said first-named means to actuate the transmission mechanism to different operative positions, the release mechanism being related to the pedal to be controlled by oscillatory movements of the pedal each less in extent than the movements necessary to operate the clutch.

29. The combination with a drive and a driven member, of a clutch for connecting the drive member to and disconnecting it from the driven member, of an oscillatory member for operating the clutch, transmission mechanism between the drive and driven members, automatic means for actuating the transmission mechanism to different predetermined positions, and holding and releasing mechanism controlled solely by the oscillatory member for in turn controlling the automatic means for actuating the transmission mechanism.

30. The combination with a drive and a driven member, of a clutch for connecting the drive member to and disconnecting it from the driven member, of an oscillatory member for operating the clutch, transmission mechanism between the drive and driven members, automatic means for actuating the transmission mechanism to different predetermined positions, and holding and release mechanism controlled solely by the oscillatory member for in turn controlling the automatic means for actuating the transmission mechanism, the holding and release mechanism being constructed to respond to movements of the oscillatory member less in extent than those necessary for the operation of the clutch.

In testimony that I claim the foregoing as my own I have hereto affixed my signature in the presence of two witnesses.

ROBERT H. HEMPHILL.

Witnesses:
A. M. JONES,
W. STANDING, Jr.